United States Patent [19]

Arbesman

[11] Patent Number: 5,285,873
[45] Date of Patent: Feb. 15, 1994

[54] DISK BRAKE FRICTION ASSEMBLY

[76] Inventor: Ray Arbesman, 125 Renaissance Ct., Thornhill Ontario, Canada

[21] Appl. No.: 836,898

[22] Filed: Feb. 19, 1992

[51] Int. Cl.$^5$ .............................................. F16D 69/00
[52] U.S. Cl. .............................. 188/73.1; 188/250 G; 29/512
[58] Field of Search ................. 188/73.1, 73.2, 250 G, 188/250 R, 250 B, 234, 218 XL, 247, 248, 250 A, 250 C, 250 H; 192/107 R; 72/352, 353.2, 355.2; 29/512; 470/29, 30

[56] References Cited

U.S. PATENT DOCUMENTS

| 3,767,018 | 10/1973 | Gordon | 188/250 G |
| 4,146,118 | 3/1979 | Zankl | 188/73.1 X |
| 4,823,921 | 4/1989 | Bosco | 188/250 B X |
| 5,078,237 | 1/1992 | Grzesiak | 188/250 H |
| 5,141,083 | 8/1992 | Burgoon | 188/73.1 |

FOREIGN PATENT DOCUMENTS

| 0144320 | 9/1982 | Japan | 188/73.1 |
| 0266838 | 11/1986 | Japan | 188/73.1 |

OTHER PUBLICATIONS

Drawing of Certified Brakes, a Lear Siegler Company dated Apr., 1980.

*Primary Examiner*—Douglas C. Butler
*Attorney, Agent, or Firm*—Griffin Butler Whisenhunt & Kurtossy

[57] ABSTRACT

The invention relates to the replaceable element which bears against a rotating disc or rotor as part of a disc brake system for a vehicle. The replaceable element includes a backing plate and a friction pad. Unlike typical systems which rivet the pad to the backing plate, the backing plate has integral upstanding fixation studs or nips. The nips are made in the plate by a semi-piercing operation to give an upstanding stud or nip. The nip is then caused to cold flow in a pressing operation to provide a cylindrical collar at the end of the nip. To affix the friction pad to the backing plate an anvil similar to a riveting anvil is forced against the cylindrical collar to turn the collar over to contact the fixation surface of the typical bore holes in the friction pad. Because rivets are eliminated the fixation process can be conducted in a single stroke of a press.

4 Claims, 4 Drawing Sheets

DISK BRAKE FRICTION ASSEMBLY

FIELD OF THE INVENTION

This invention relates to improvements in friction assemblies intended for use with disc brakes on vehicles. The friction assembly is the replaceable element which bears against the rotating disc called the rotor. As the friction material is worn away during succeeding brake applications, there eventually becomes a need to replace the friction assembly. The friction assembly comprises a backing plate to which is adhered a friction pad. The friction pad alone contacts the rotor of a disc brake to provide the stopping frictional force.

Typically the friction assemblies which have been used heretofore comprise a steel backing plate. The backing plate is provided with a plurality of apertures. There is also provided a friction pad which also has a set of similarly spaced and sized apertures. The apertures in the friction pad and in the steel plate are provided with relatively larger counter bores. Rivets are then used to fix the friction pad to the backing plate. The head of the rivet typically bears against the friction pad while the overturned or clinched end of the rivet bears against the steel backing plate.

Rivets used with conventional friction assemblies must counteract the forces tending to separate the friction pad from the plate during the braking force. One of the primary forces is a sheer force. This force would tend to tip the rivet in the hole with the shank of the rivet bearing against the side of the aperture in the backing plate and in the friction pad. The other major force is the force which is axial to the rivet in which the pad is removed directly away from the backing plate. This later force is a minimal force in the operation of most disc brake set ups.

Accordingly, the principal component which is involved is the force which tends to sheer the rivet. While conventional assemblies have been adequate there is room for improvement. Any relative motion between the friction pad and the backing plate will lead to premature failure of the friction assembly. Several problems have developed with the conventional friction assemblies which sometimes lead to premature failure.

When the aperture is stamped in the backing plate there are several considerations which may lead to premature failure. One of the initial considerations in manufacturing such a backing plate is the clearance between the shank of the rivet to be used and the aperture to be made in the backing plate. It is clear that the greater the clearance, the greater is the chance that some movement will occur between the shank of the rivet and the backing plate. Another problem which is not quite so clear is the fact that it is difficult when punching a hole through the backing plate to ensure that the hole is precisely the same diameter on the entry and exit sides. This is sometimes referred to as the "break" of the hole in the backing plate. Depending upon the die clearance it has been observed that there is a considerable taper in most holes as punched through the backing plate. This may mean that the diameter of the hole punched through the backing plate could vary as much as 0.03 in an aperture which was intended to be 0.210. This means that on the break side the aperture may measure as large as 0.240. This taper provides unwanted clearance and may lead to premature failure.

Just as there is clearance required between the rivet and the backing plate, there is also clearance required between the friction pad and the shank of the rivet. As the thickness of the friction pad at the point where it bears upon the shank of the rivet is usually much less than the thickness of the steel backing plate the hole through the friction is normally drilled and therefore considered to be more precisely cylindrical rather than tapered. Nevertheless some clearance is required and this clearance only exacerbates the potential for movement of the friction pad relative to the backing plate.

Because this is essentially a three component system, movement can occur in two places. Firstly the friction pad can move with respect to the shank of the rivet. Secondly, the shank of the rivet can move with respect to the backing plate. These two potential areas of movement are cumulative and thus the summation of the clearance determines the amount of potential movement between the friction pad and the backing plate. It will be appreciated by those skilled in the art that if some movement occurs the rivet is then tipped within the aperture relative to the backing plate. Tipping of the rivet shank relative to the backing plate then loads the head and clinched end of the rivet thereby opening up the rivet. With the rivet clinch no longer being as tight the potential for failure is increased.

Typically the friction pad is adhered to the backing plate by a plurality of rivets. Often there may be as many as eight although this will depend upon the size of the friction assembly. In the typical friction assembly used heretofore, the rivets are installed one at a time during the assembly process. The friction pad is located on the backing plate. A rivet is then placed into position so that it passes into the aperture. Then typical riveting tools comprising a spring loaded anvil are used to clinch over the open end of the rivet. While theoretically, riveting machines exist which are capable of operating with multiple heads and therefore clinching rivets in a ganged operation this has seldom proven to be reliable. One of the major problems with multiple head riveting machines is the delivery of all of the rivets into the apertures reliably. With a single head machine if the rivet is not properly delivered from the magazine to the aperture, another stroke of the riveting apparatus can be conducted to replace the rivet that was not properly delivered or seated. With a multiple head machine however, if some rivets are delivered and others are not it is not possible to deliver a second stroke of the multiple head machine. For this practical reason very few friction assemblies are made using multiple head machines.

One of the difficulties in delivering rivets in multiple head machines is of course the fact that the apertures are sized so as to provide the minimum clearance between the shank of the rivet and the aperture. While increasing the clearance might give more reliable rivet delivery and placing, increasing the clearance gives rise to the problems discussed above.

It has long been recognized that it would be desirable to have all of the rivets clinched at the same time in a single stroke operation. This, however, has not proven practically reliable.

In accordance with this invention a friction assembly includes a backing plate and a friction pad. The backing plate comprises a plurality of fixation nips. The fixation nips are formed by punching material from the backing plate to extrude the friction nips from the plate. Each nip has an end remote from the plate and the nip is provided with a cylindrical wall at this end by cold extruding of the nip.

In order to produce the backing plate referred to above, the fixation nips are formed by a half-way piercing operation with a punch in a die. Thereafter the ends of the nips remote from the plate are cold extruded using a punch and bush to form a cylindrical wall at the end of the nips.

The friction assembly of this invention includes a backing plate as described above and a friction pad. The friction pad has a plurality of counter bored apertures corresponding to the pattern of fixation nips arranged on the backing plate. These apertures are arranged so as to receive all of the nips of the backing plate. In the friction assembly the cylindrical walls of the nips are overturned to contact the fixation surface of the friction pad so as to affix the friction pad to the plate.

In accordance with the invention a method of affixing a friction pad to a steel backing plate to form a friction assembly includes the step of first assembling a backing plate and a friction pad as discussed above. After assembly the cylindrical walls of the fixation nips are overturned using an anvil to affix the friction pad to the backing plate. In a particularly advantageous embodiment of the process the cylindrical walls of all of the fixation nips may be overturned in a single stroke with a multiple anvil press.

The invention will be better understood with reference to the following description of a preferred embodiment of the invention and in which.

Figure 1:
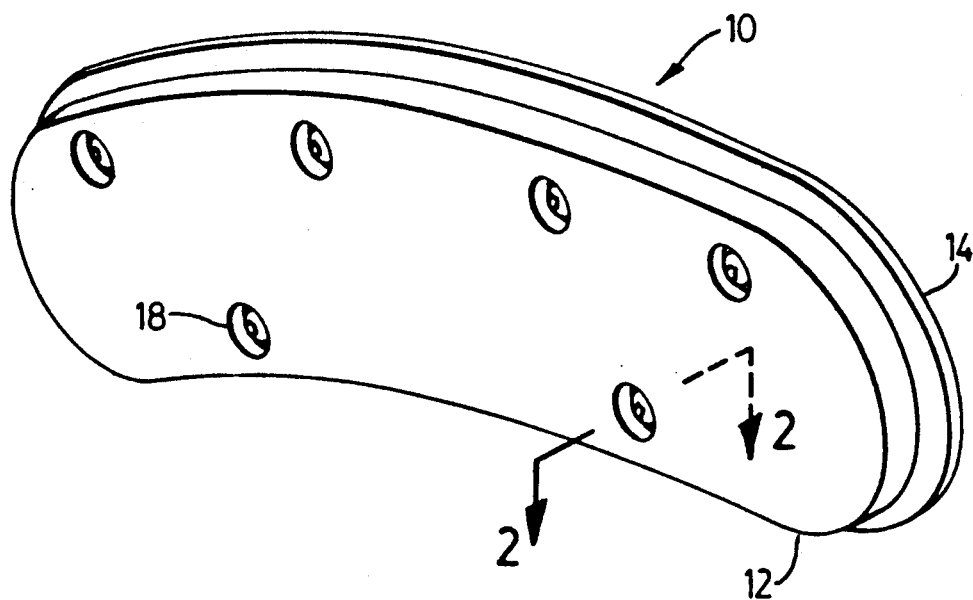
FIG. 1 illustrates a friction assembly in accordance with the invention.

FIG. 1 illustrates the friction assembly 10. The friction assembly comprises a friction pad 12 and a backing plate 14. The backing plate 14 comprises a plurality of fixation nips 16 which are arrayed about the surface of the backing plate 14 in a desirable pattern. The friction pad 12 comprises a plurality of apertures 18. The apertures 18 are arrayed about the surface of the friction pad 12 in the same pattern as the fixation nips 16 of the backing plate 14.

The apertures 18 in the friction pad 12 comprise a central through-bore 22 and a larger counter-bore 24. The base of the counter-bore 24 comprises a fixation surface 26 which surrounds the through-bore 22. The diameter of the through-bore 22 is just slightly larger than the exterior diameter of the fixation nip 16. As an example, we have found an acceptable friction assembly can be manufactured using a through bore 22 of diameter 0.218" for use with a fixation nip of O.D. 0.210".

Figure 4:
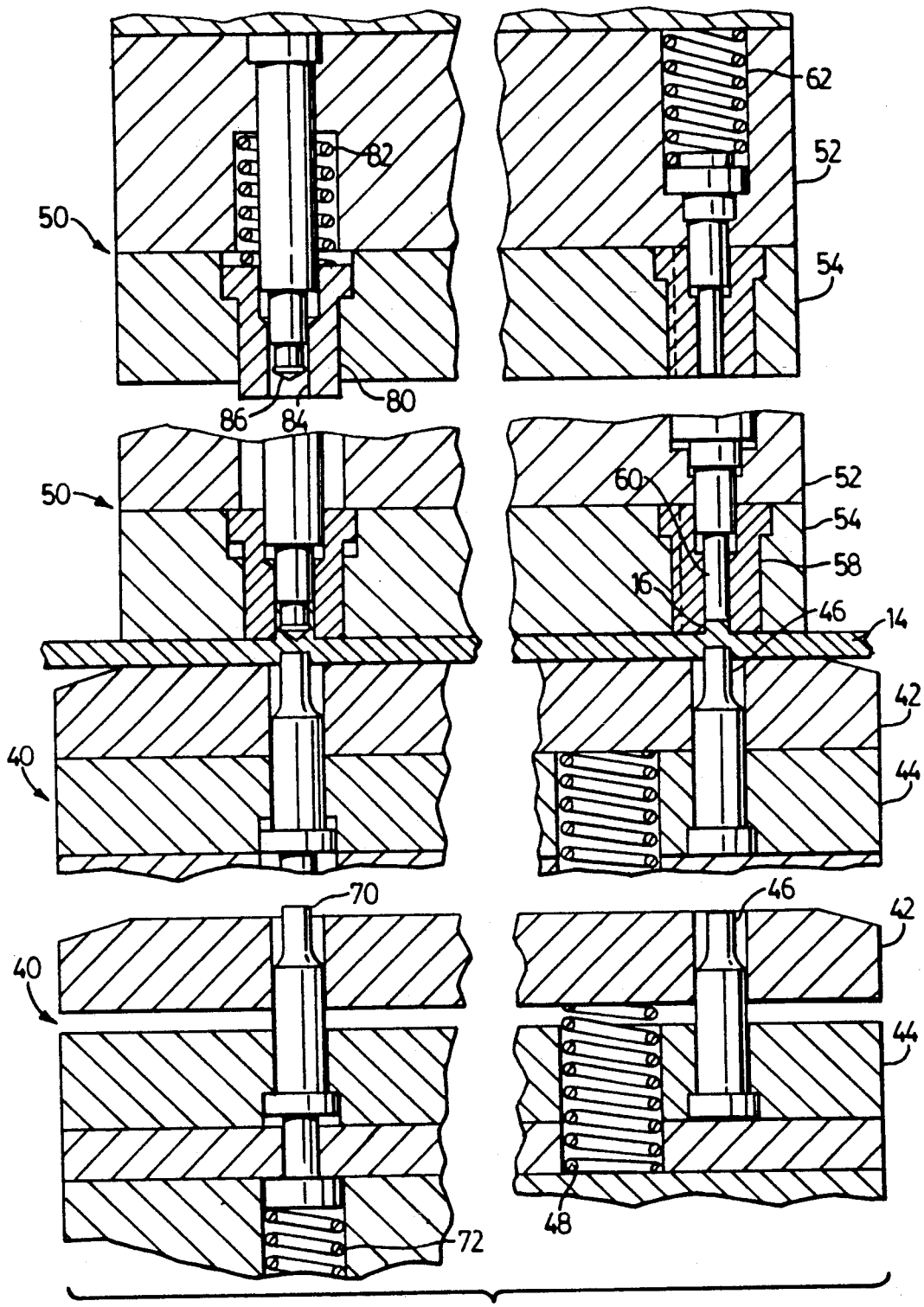
FIG. 4 illustrates a two stage press for manufacturing the backing plate and the fixation nips.

The backing plate 14 may be most effectively manufactured in a two stage press such as that illustrated in FIG. 4. FIG. 4 shows a punch and die press. The top portion of the figure shows the punch in the open position. The bottom portion of the figure shows the die in the open position. The middle portion of the figure illustrates the punch and die together in the closed position. The first stage of the manufacture of the backing plate occurs in the right-hand portion of FIG. 4. When the press is cycled, the backing plate is moved to the left as shown and the formation of the fixation nip is completed in the second stage. While FIG. 4 shows only one punch and die for each of the first and second stages, this is for illustration purposes only. Advantageously all of the fixation nips are made in the first step with one stroke of the die while all of the fixation nips are completed in the second stage of the die. The material is continuously fed into the press so that step one is being carried out on one backing plate while step two is being carried out on the second backing plate. The punch and die shown in FIG. 4 has been simplified. Typical alignment means and other unessential features have been removed for clarity of illustration of the pertinent points relevant to this invention. Those familiar with the operation of such presses will appreciate that no special arrangements are required in the press. Rather, only the particular punches, dies, anvils, supports and bushes referred to below are required for manufacture of the novel backing plate.

The lower part of the die 40 comprises split sections 42 and 44. The fixed portion 44 provides the base for punch 46. As illustrated the punch 46 aligns with the moving part 42 of lower part 40. As the moving part 42 collapses the spring 48, the tip of the punch 46 will protrude from the moving part when the moving part contacts the backing plate 14. The upper part of the die 50 is also split to two parts 52 and 54. The two portions 52 and 54 do not have any relevant movement but do permit for installation of the various parts as illustrated. The lower part 54 of the upper part of the die 50 houses a bush 58. The bush 58 bears upon the backing plate 14 during the metal forming process. The bush 58 comprises a central bore containing a moveable pin 60. The moveable pin 60 can move vertically upwardly as shown in FIG. 4 by collapsing the spring 62.

During the first stage forming, the press is closed, bringing the lower portion 54 of the upper part of the die into contact with the backing plate 14. As the moveable portion 42 of the lower part of the die collapses the spring 48, the punch 46 will protrude from the surface of moving part 42. This will cause the punch 46 to enter into the packing plate 14 causing the material to flow vertically upwardly into the bore of the bush 58. This operation is essentially the same as a hole piercing operation. The operation, however, is confined so that the punch 46 does not completely penetrate the backing plate 14. Rather this is a half-way piercing operation. The material that is removed by the piercing operation passes upwardly into the bore of the bush 58. As the material moves into the bore the pin 60 retracts by collapsing the spring 62. This first stage then forms the first section 16A of the fixation nip.

Figure 5:
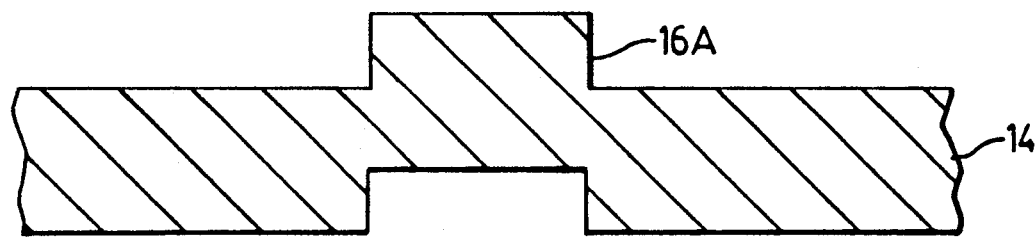
FIG. 5 illustrates the backing plate after the first stage of the press of FIG. 4.

FIG. 5 is an enlarged view of the portion of the backing plate 14 after completion of this first stage. From review of FIG. 5 it will be appreciated that the operation produces a substantially cylindrical, solid, upstanding fixation nip 16A. While only one such punch and bush has been shown in FIG. 4, it is expected that in a commercial production operation all of the fixation nips to be formed on any particular backing plate will be made in a single closing of the press.

The backing plate 14 with the partially formed fixation nip 16A is then indexed from the first stage position to the second stage position. It will be realized by those familiar with this art that ejection pins and other mechanisms may well be contained within the die. These conventional details have not been illustrated in the drawings as those details form no part of this invention.

The lower portion of the die 40 guides a moveable support 70. The moveable support is vertically moveable within the die by collapsing the spring 72.

The upper portion 50 of the die comprises a moveable bush 80 which can move vertically in the die by collapsing spring 82. The bush 80 comprises an internal bore 84. Within the internal bore 84 there is a fixed punch 86 which is supported by the upper portion 52 of the upper portion of the die. An enlarged view of the second stage material with the die closed is illustrated in FIG. 6.

Figure 6:
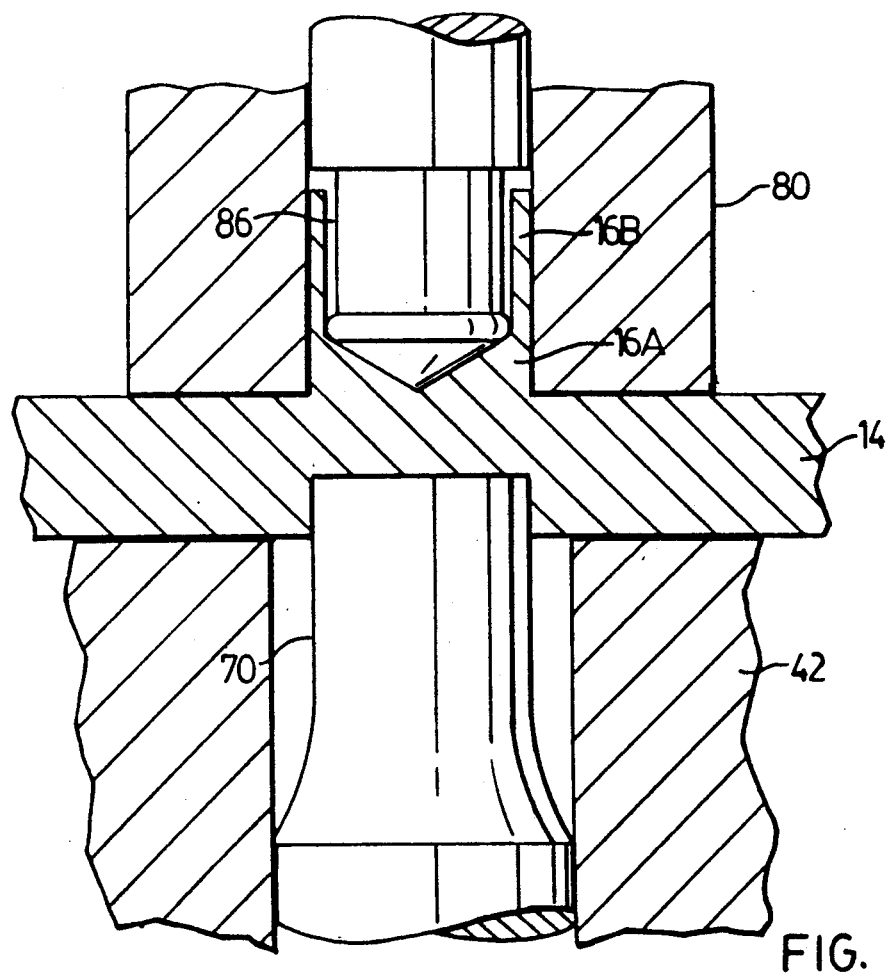
FIG. 6 illustrates an enlarged view of the second step of the press of FIG. 4.

When the die is closed the configuration of the operating parts and the metal parts is shown in FIG. 6. The support 70 moves into the cavity created by the punch 46. The support 70 acting against the spring 72 prevents any flow of material into the void originally created by the punch 46.

As the punch 86 moves into the fixation nip 16A, a cold extrusion of the metal is caused. There is clearance between the outside diameter of the punch 86 and the internal bore 84 of the bush 80. As the press is closed the bush 80 will contact the upper surface of the backing plate 14 and further movement of the press will cause deflection of the spring 82. As the bush 80 is held tightly against the backing plate 14 by the press and the spring 82, and as the support 70 supports the backing plate 14 from beneath, penetration of the punch 86 causes cold flow of the metal of the partially formed fixation nip 16A upwardly around the punch 86 to form a cylindrical wall at the end of the fixation nip. The height of the cylindrical wall is controlled by the location of the punch 86 within the press.

This second step completes the formation of the fixation nip 16. When the press opens, the fixation nip 16 will include a solid portion 16A and a cylindrical wall 16B at the end of the fixation nip which is remote from the backing plate 14.

Although only one punch 86 is shown in FIG. 4. In a commercial production situation a number of punches will be provided in the press so that the completion of the formation of the fixation nip 16 can be carried out on all fixation nips for each individual plate. As indicated above, the second stage of the die may also contain ejection pins and other conventional parts which have not been shown as these do not form part of this invention.

Figure 2:
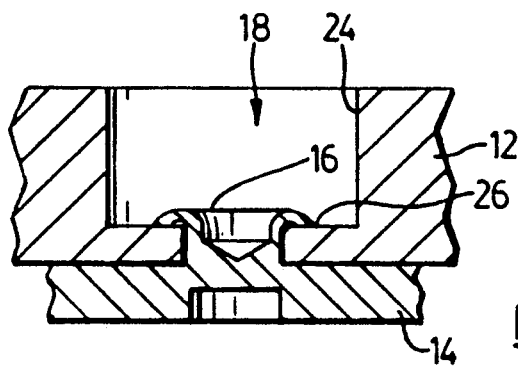
FIG. 2 illustrates a cross-section through the friction assembly of FIG. 1 along line 2—2.
Figure 3:
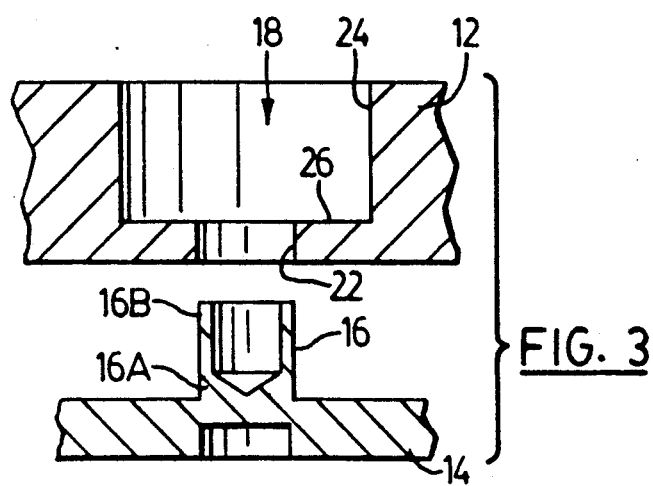
FIG. 3 is a view similar to FIG. 2 showing the backing plate and friction pad aligned but prior to assembly.

FIGS. 2 and 3 illustrate the assembly of the friction pad to the backing plate. In FIG. 3 the friction pad 12 is shown positioned above the backing plate 14. The friction pad 12 is moved toward the backing plate 14 so that the fixation nips 16 pass through the through bores 22 of the friction pad. Because the outside diameter of the fixation nip 16 is closely controlled by the bush 80, there is good tolerance control of the outside diameter of the fixation nips. Thus, minimal clearance may be provided between the outside diameter of the fixation nip 16 and the diameter of the bore 22. With the friction pad 12 located on the backing plates 14 the fixation nips 16 will extend through the bores 22 with the cylindrical wall 16B projecting above the fixation surface 26. In order to affix the friction pad 12 to the backing plate 14, an operation similar to a more typical rivetting operation is carried out.

In order to form the clinch a simplified anvil 90 having the surface of the type usually used in rivetting may be forced against the cylindrical wall 16B while supporting the plate 14. The anvil will pass down through the aperture 18 and will have an outside diameter less than the diameter of the counter-bore 24. The anvil will turn over the cylindrical wall as shown in FIG. 2 to clinch the fixation nip against the fixation surface 26.

Although this step is similar to conventional rivetting, those familiar with typical friction assemblies will recognize that the clinch in this situation is being done in a reverse manner. Typically when friction pads are rivetted to backing plates, the head of the rivet bears against the fixation surface 26. When conventional rivetting is carried out a support or base must be positioned within the counter-bore 24 bearing against the head of the rivet. Typically a spring loaded anvil then passes into a counter-bore in a conventional backing plate and turns over the rivet to clinch the rivet against the backing plate. The process for use with this novel friction assembly does not require a separate support for each area of fixation. Rather, the plate itself is supported on a base 92 and a simple non-spring loaded anvil is forced against the cylindrical wall 16B of the fixation nip by press 94.

Figure 7:
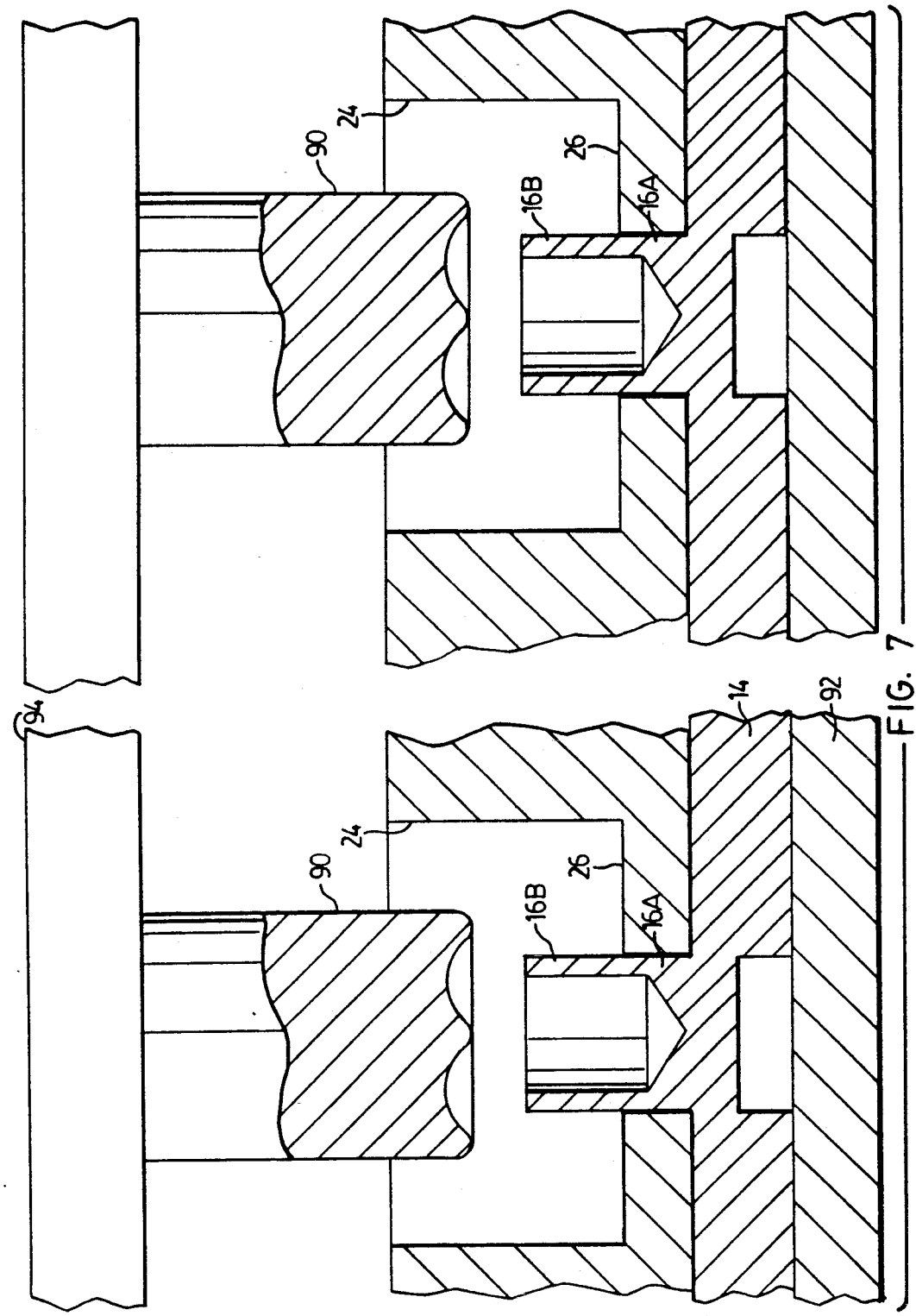
FIG. 7 illustrates the final assembly step of the assembly of FIG. 1.

One of the difficulties of use of a multiple head rivet machine arises because of the difficulty of dependably delivering rivets to the rivetting anvil each time the machine is cycled. As there is no delivery of any type of fastener with this improved backing plate and friction assembly, this major element for potential failure does not exist with the improved structure. Thus, in commercial processes, the clinching operation will be performed in a press 94. That press 94 will advantageously contain a separate anvil 90 for each of the fixation nips 16 required for any particular backing plate 14. Upon one cycling of the press 94, the clinching operation can be simultaneously carried out on all of the fixation nips 16. This is shown in FIG. 7. Thus, the fixation of the friction pad 12 to the backing plate 14 can be accomplished in a single step with all fixation nips 16 being clinched simultaneously. This can be readily accomplished using a standard press 94, a single support surface 92 and a plurality of anvils 90 located in the same pattern as the fixation nips 16.

Various amendments and modifications may be made to the structures and processes disclosed herein without departing from the invention as defined in the following claims.

I claim:

1. In a brake backing plate for a brake friction pad in a disk brake assembly, wherein the brake friction pad has a plurality of through bores for receiving a plurality of nips punched through the thickness of the brake backing plate and a plurality of fixation surfaces clinchable by an upper portion of each nip in a riveting step for fastening the brake friction pad to the brake backing plate, the improvement wherein each nip comprises:

a generally cylindrical, upstanding, cold extruded portion of the backing plate formed from substantially all material of the backing plate under the cold extruded portion with an upper end thereof extending from an upper surface of the backing plate a distance greater than the thickness of the backing plate, said cold extruded portion having a cylindrical cavity extending thereinto from the upper end thereof a distance sufficient to form a cylindrical wall surrounding the cavity that is overturnable in said riveting step so as to be clinchable against the fixation surface but insufficient to pass through the backing plate so as to provide a solid portion of the cold extruded portion between the cavity and a bottom surface of the backing plate.

2. The backing plate of claim 1 wherein the plurality of said nips are arranged in a pattern over the upper surface of the plate and the friction pad has the plurality of said bores and fixation surfaces in a matching pattern.

3. The backing plate of claim 2 wherein the fixation surfaces surround said bores.

4. The backing plate of claim 1 wherein each through bore closely receives a nip.

* * * * *